(12) United States Patent
Jiang et al.

(10) Patent No.: US 9,145,517 B2
(45) Date of Patent: Sep. 29, 2015

(54) RARE EARTH GARNET SCINTILLATOR AND METHOD OF MAKING SAME

(75) Inventors: Haochuan Jiang, Brookfield, WI (US); Anant Achyut Setlur, Niskayuna, NY (US); Robert Joseph Lyons, Burnt Hills, NY (US); Kevin Alan David, Waterford, WI (US); James Edward Murphy, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 534 days.

(21) Appl. No.: 13/448,779

(22) Filed: Apr. 17, 2012

(65) Prior Publication Data
US 2013/0270482 A1    Oct. 17, 2013

(51) Int. Cl.
*C09K 11/80*    (2006.01)
*C09K 11/77*    (2006.01)

(52) U.S. Cl.
CPC .................................. *C09K 11/7774* (2013.01)

(58) Field of Classification Search
USPC ............ 252/301.4 R; 117/945; 501/152, 153, 501/126; 250/370.11
See application file for complete search history.

(56) References Cited

U.S. PATENT DOCUMENTS

| | | |
|---|---|---|
| 4,421,671 A | 12/1983 | Cusano et al. |
| 5,057,692 A | 10/1991 | Greskovich et al. |
| 5,109,159 A | 4/1992 | Hagiwara et al. |
| 5,391,876 A | 2/1995 | Tsoukala et al. |
| 5,484,750 A | 1/1996 | Greskovich et al. |
| 6,093,347 A | 7/2000 | Lynch et al. |
| 6,585,913 B2 | 7/2003 | Lyons et al. |
| 6,630,077 B2 | 10/2003 | Shiang et al. |
| 6,793,848 B2 | 9/2004 | Vartuli et al. |
| 7,008,558 B2 | 3/2006 | Vartuli et al. |
| 7,014,977 B1 | 3/2006 | Dickerson et al. |
| 7,076,020 B2 | 7/2006 | Kanai et al. |
| 7,132,786 B1 | 11/2006 | Debray et al. |
| 7,164,134 B2 | 1/2007 | Wei et al. |
| 7,560,046 B2 | 7/2009 | Lyons et al. |
| 7,595,492 B2 * | 9/2009 | Nakamura et al. ......... 250/361 R |
| 2010/0059681 A1 * | 3/2010 | Nakamura et al. ........ 250/361 R |
| 2012/0018923 A1 | 1/2012 | Jiang et al. |

FOREIGN PATENT DOCUMENTS

GB        1589964         5/1981
JP     2011-153200     *  8/2011

OTHER PUBLICATIONS

Translation for JP 2011-153200, Aug. 11, 2011.*
Kanai et al., "Characteristics of a Nonstoichiometric Gd3+(Al,Ga)5-O12:Ce Garnet Scintillator," Journal of the American Ceramic Society, vol. 91, No. 2, 2008, pp. 456-462.

* cited by examiner

*Primary Examiner* — Carol M Koslow
(74) *Attorney, Agent, or Firm* — Ziolkowski Patent Solutions Group, SC (57) ABSTRACT

A detector for detecting high-energy radiation is disclosed. The detector includes scintillating material with a garnet structure includes gadolinium, yttrium, cerium, gallium, and aluminum. The scintillating material is expressed as $(Gd_{1-x-y-z}Y_xA_yCe_z)_{3+u}(Ga_{1-m-n}Al_mD_n)_{5-u}O_{12}$:wFO, wherein A is lutetium, lanthanum, terbium, dysprosium, or a combination thereof; D is indium, scandium, or a combination thereof; F is a divalent ion; $0 \leq x < 0.2$, $0 < y < 0.5$, $0.001 < z < 0.05$, $0 < u < 0.1$, $0 \leq n < 0.2$, $0.3 < m < 0.6$, and 10 ppm $\leq w \leq$ 300 ppm; and $y/x > 1$.

17 Claims, 7 Drawing Sheets

RARE EARTH GARNET SCINTILLATOR AND METHOD OF MAKING SAME

BACKGROUND OF THE INVENTION

Embodiments of the invention relate generally to a scintillator for x-ray detection, and more particularly to a rare earth garnet scintillator composition having enhanced performance and a method for making same.

Typically, an imaging system such as a computed tomography (CT) or an x-ray imaging system includes an x-ray source positioned to emit x-rays toward a detector, and an object positioned therebetween. In CT imaging systems, the x-ray source emits a fan-shaped beam toward a subject or object, such as a patient or a piece of luggage. Hereinafter, the terms "subject" and "object" shall include anything capable of being imaged. Generally, the x-ray source and the detector array are rotated about the gantry within an imaging plane and around the subject. X-ray sources typically include x-ray tubes, which emit the x-ray beam at a focal point.

The x-ray beam, after being attenuated by the subject, impinges upon an array of x-ray detectors. The intensity of the attenuated beam radiation received at the detector array is typically dependent upon the attenuation of the x-ray beam by the subject. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom. In order to achieve high-resolution images, the scintillator material is often diced into small pieces or cells and assembled in a pixilated array with desired geometry prior to attaching to the photodiode.

The scintillator material of a cell or element of a scintillator array converts x-rays to light energy. In particular, the scintillator material absorbs x-rays incident on that cell and discharges light energy (photons) to a photodiode adjacent thereto. Each photodiode detects the light energy and generates a corresponding electrical signal indicative of the attenuated beam received by each detector element. The outputs of the photodiodes are then transmitted to the data processing system for image reconstruction.

Scintillators typically comprise a non-luminescent host material that has been modified by inclusion of an activator species that is present in the host material in a relatively low concentration. The host crystal absorbs the incident photon, and the absorbed energy may be accommodated by the activator ions, or it may be transferred by the lattice to the activator ions. One or more electrons of the activator ions are raised to a more excited state. These electrons, in returning to their less excited state, emit a photon of luminescent light.

Solid state ceramic scintillators are currently used as radiation detectors to detect penetrating radiation. One embodiment of the present generation of solid-state ceramic scintillators comprises oxide mixtures in which a rare earth oxide is present as an activator, along with various combined matrix elements which are also usually rare earth oxides. One embodiment of the present generation of solid-state ceramic scintillators comprise a major proportion of yttria ($Y_2O_3$), up to about 50 mole percent gadolinia ($Gd_2O_3$), and a minor activating proportion (typically about 0.02-12 mole percent) of a rare earth activator oxide. Activator oxides include europium, neodymium, ytterbium, dysprosium, terbium, cerium, and praseodymium. Other metallic compounds may also be present as additives for specific purposes.

The material properties of scintillators vary greatly based on the specific chemical composition of the scintillator. These properties include scintillator efficiency, primary decay time, afterglow, hysteresis, luminescent spectrum, x-ray stopping power, and resistance to radiation damage. The efficiency of a luminescent material is the percentage of the energy of the absorbed stimulating radiation which is emitted as luminescent light. When the stimulating radiation is terminated, the luminescent output from a scintillator decreases in two stages. The first of these stages is a rapid decay from the full luminescent output to a low, but normally non-zero, value at which the slope of the decay changes to a substantially slower decay rate. This low intensity, normally long decay time luminescence, is known as afterglow. Specifically, afterglow is the light intensity emitted by the scintillator at 100 milliseconds after the x-ray excitation ceases, reported as a percentage of the light emitted while the scintillator is excited by the radiation. Afterglow provides a background luminescent intensity, which is a noise contribution to the photodetector output. In some cases, afterglow is increased by the presence of impurities, and in other cases, afterglow is decreased by the presence of impurities.

The initial, rapid decay is known as the primary decay or primary speed and is measured from the time at which the simulating radiation ceases to the time at which the luminescent output falls to about 36.8% (or 1/e) of the light intensity at the time after the x-ray excitation ceases. Scan times of CT systems, which are the times required for a CT system to scan and acquire an image of a slice of the subject under observation, are related to the primary decay time of the scintillator roughly by a factor of 1,000. For example, a scintillator having a decay time of 1 millisecond will typically produce a scan time of about 1 second. Thus, shorter CT scan times require shorter scintillator decay times. As the speed of data processing in CT scanners increases due to advances in electronic circuit designs, it is desired to have faster scintillators, i.e., shorter time between receipts of stimulating radiation pulses so to fully take advantage of the capability of the scanner. Therefore, any measurable percentage decrease in decay time from that exhibited by the present generation of ceramic scintillator would be a distinct improvement. Decreasing scan time increases the number of patients that can be scanned, as well as the number of scans taken in a single measurement, as each measurement requires a patent breathold during the measurement period. Shorter scan times also reduce image blurring due to motion of internal organs or motion that occurs when taking scans of non-cooperating patients, such as young children.

Another important consideration for scintillators is to reduce damage that occurs on the scintillator upon repeated exposure of the scintillator to high energy radiation. Radiographic equipment employing solid state scintillator materials for the conversion of high energy radiation into an optical image may experience changes in efficiency after exposure of the scintillator to high dosages of radiation. Radiation damage is the characteristic of a luminescent material in which the quantity of light emitted by the luminescent material in response to a given intensity of stimulating radiation changes after the material has been exposed to a high radiation dose. Radiation damage in scintillators is characterized by a change in light output and/or a darkening in color of the scintillator body with prolonged exposure to radiation. Radiation damage can lead to "ghost images" from prior scans which thereby reduce image resolution. When radiation damage becomes too high, the scintillator must be replaced because of the cumulative effects of the radiation damage. This results in a substantial capital cost for the replacement of the scintillation detecting system. Additionally, the effects of radiation damage may require recalibration of the imaging system throughout the work day. Such recalibration takes time and also exposes the scintillator material to additional radiation, which contributes further damage.

In systems such as CT scanners, it is also desirable that the scintillator have high x-ray stopping power, which refers to the ability of a material to absorb radiation, commonly called the attenuation or absorption. A material having a high stopping power allows little or no radiation to pass through. Since x-ray stopping power is inversely related to the patient radiation dose required for obtaining high quality patient images, a scintillator with high x-ray stopping power can absorb substantially all of the incident x-rays in the luminescent material in order to minimize the x-ray dose to which the patient must be exposed in order to obtain the CT image. Higher stopping power is also preferred because a smaller quantity of scintillator material is needed. Thus, thinner detectors are possible, resulting in lower cost of manufacture.

In typical medical and industrial radiographic applications, the scintillator also must be an efficient converter of x-ray radiation (or other high-energy radiation) into optical radiation for the regions of the electromagnetic spectrum detected by the photodiode. As used herein, the term "light output" is the quantity of visible light emitted by a respective scintillator element after being excited by a pulse of x-ray.

Thus, there is a need to develop scintillator materials that have a short decay time (to minimize scan time), reduced afterglow, high light output, show reduced damage upon repeated exposure to the high energy radiation typically employed in applications requiring scintillators (to increase the reproducibility of the measurements), and high x-ray stopping power. There is also a need to develop scintillators that are cost-effective to manufacture.

As stated above, the properties of the scintillator vary greatly based on the material composition of the scintillator. Thus, the substitution of one rare earth element for another or even a minute change in the concentration of one element in the scintillator's composition can have significant consequences on the performance of the scintillator. Although work has been done to identify how certain combinations of elements affect scintillator performance, exactly how or why specific elements interact to influence scintillator performance is not fully understood. Thus, the current state of the art is unable to precisely predict the resulting properties of a scintillator from the chemical composition alone.

Therefore, it would be desirable to develop a scintillator that has decreased afterglow, improved efficiency, enhanced stability under radiation, and desirable x-ray stopping power.

BRIEF DESCRIPTION OF THE INVENTION

According to one aspect of the invention, a scintillating material with a garnet structure includes gadolinium, yttrium, cerium, gallium, and aluminum. The scintillating material is expressed as $(Gd_{1-x-y-z}Y_xA_yCe_z)_{3+u}(Ga_{1-m-n}Al_mD_n)_{5-u}O_{12}$:wFO, wherein A is lutetium, lanthanum, terbium, dysprosium, or a combination thereof; D is indium, scandium, or a combination thereof; F is a divalent ion; $0 \le x < 0.2$, $0 < y < 0.5$, $0.001 < z < 0.05$, $0 < u < 0.1$, $0 \le n < 0.2$, $0.3 < m < 0.6$, and $10 \text{ ppm} \le w \le 300 \text{ ppm}$; and $y/x > 1$.

According to another aspect of the invention, a method of manufacturing a rare earth garnet scintillator composition is set forth. The method includes the step of preparing a first solution comprising amounts of yttrium, at least one of lutetium, lanthanum, terbium, and dysprosium, and a divalent ion other than magnesium. The method also includes the steps of dissolving the first solution in an acid to form a second solution and preparing a third solution by mixing the second solution with amounts of gallium, aluminum, and cerium. The method further includes the step of firing the third solution for a time sufficient to convert the third solution to a rare earth-activated garnet scintillator composition. The components in the first and third solutions are selected to obtain a scintillator composition having a formula of $(Gd_{1-x-y-z}Y_xA_yCe_z)_{3+u}(Ga_{1-m-n}Al_mD_n)_{5-u}O_{12}$:wFO, wherein A is at least one member selected from the group consisting of lutetium, lanthanum, terbium, and dysprosium, D is at least one member selected from the group consisting of indium and scandium, F is a divalent ion, and x is in a range from and including 0 to 0.2, y is in a range from about 0 to 0.5, the ratio of y to x is greater than 1, z is in a range from about 0.001 to 0.05, u is in a range from about 0 to 0.1, n is in a range from about 0 to and including 0.2, m is in a range from about 0.3 to 0.6, and w is in a range from and including 10 ppm to and including 300 ppm.

According to yet another aspect of the invention, a detector element capable of detecting high-energy radiation includes a cerium-activated gadolinium aluminum gallium garnet scintillator composition having a formula of $(Gd_{1-x-y-z}Y_xA_yCe_z)_{3+u}(Ga_{1-m-n}Al_mD_n)_{5-u}O_{12}$:wFO. A is at least one rare earth metal selected from the group consisting of Lu, La, Tb, Dy or any combination thereof, D is selected from the group consisting of In and Sc, F comprises a divalent ion other than magnesium, and x is in a range from and including 0 to 0.2, y is in a range from about 0 to 0.5, the ratio of y to x is greater than 1, z is in a range from about 0.001 to 0.05, u is in a range from about 0 to 0.1, n is in a range from about 0 to and including 0.2, m is in a range from about 0.3 to 0.6, and w is in a range from and including 10 ppm to and including 300 ppm.

Various other features and advantages will be made apparent from the following detailed description and the drawings.

DETAILED DESCRIPTION

Embodiments of the invention are described below with respect to the detection and conversion of x-rays. However, one skilled in the art will appreciate that the invention is equally applicable for the detection and conversion of other high frequency electromagnetic energy. Further, the operating environment of the invention is described with respect to a "third generation" CT scanner and sixty-four-slice computed tomography (CT) system. However, those skilled in the art will appreciate that embodiments of the invention are equally applicable for use with other multi-slice configurations and other CT systems. Thus, although a medical CT imaging system is described below with respect to the invention, a skilled artisan will readily recognize that embodiments of the invention are equally applicable to various alternate medical and industrial imaging systems including security and industrial CT applications, nuclear physics and outer space exploration applications, downhole drilling for oil and gas exploration, positron emission tomography (PET), digital radiography, and other x-ray, gamma radiation, ultra-violet radiation, and nuclear radiation detecting applications.

Figure 1:
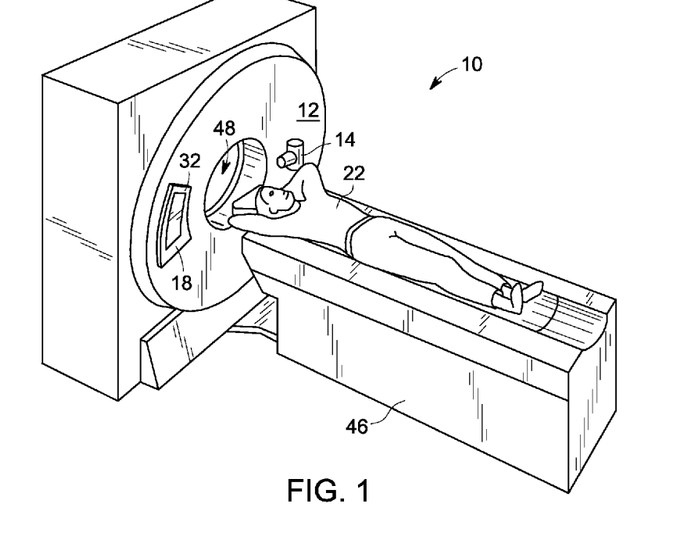
FIG. 1 is a pictorial view of a CT imaging system.
Figure 2:
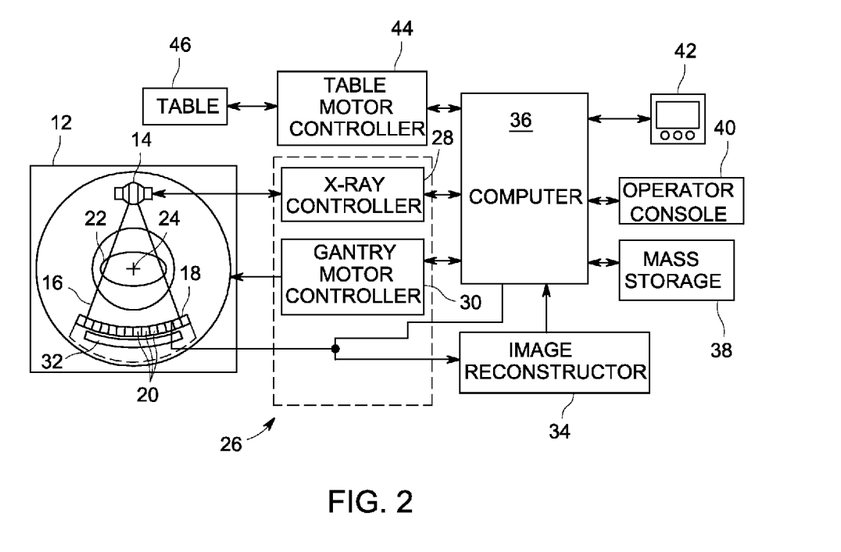
FIG. 2 is a block schematic diagram of the system illustrated in FIG. 1.

Referring now to FIG. 1, a computed tomography (CT) imaging system 10 is shown as including a gantry 12 representative of a "third generation" CT scanner. Gantry 12 has an x-ray source 14 that projects a beam of x-rays toward a detector assembly or collimator 18 on the opposite side of the gantry 12. Referring now to FIG. 2, detector assembly 18 is formed by a plurality of detectors 20 and data acquisition systems (DAS) 32. The plurality of detectors 20 sense the projected x-rays 16 that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part.

Figure 3:
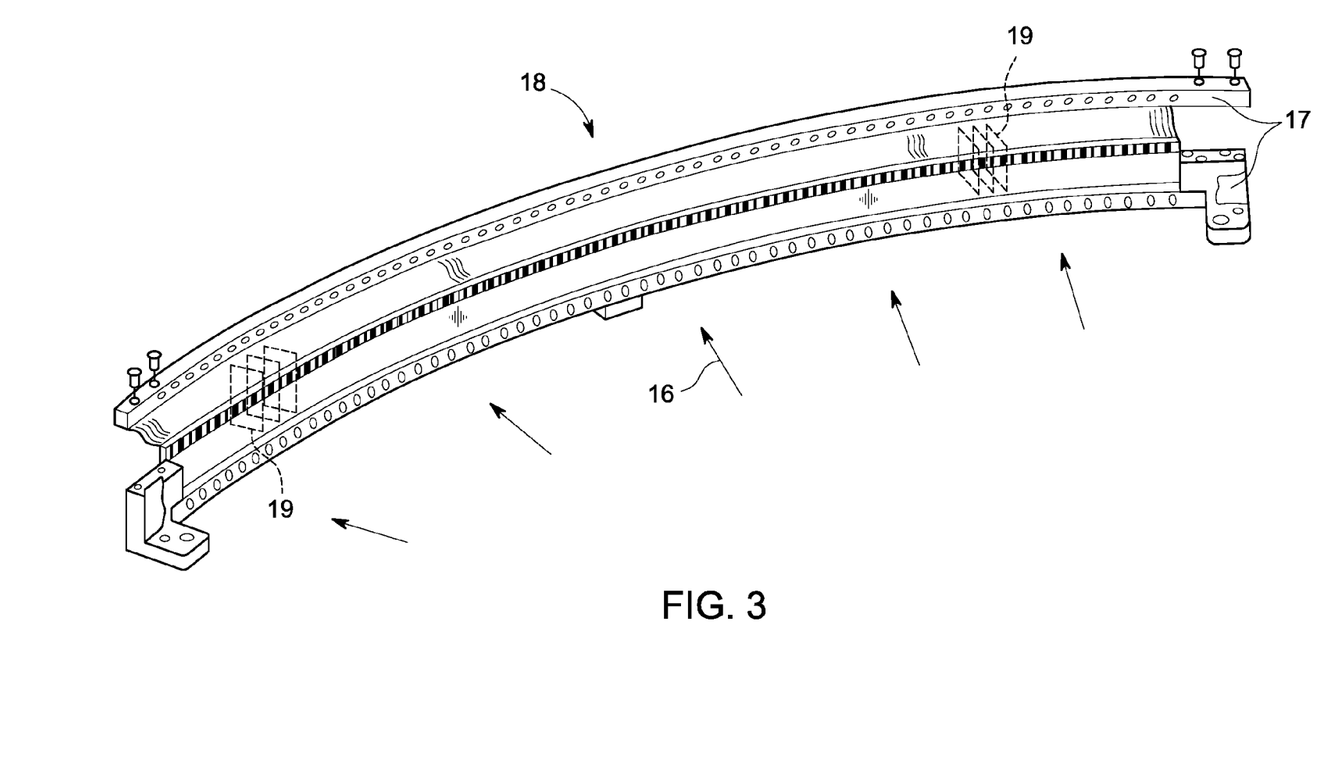
FIG. 3 is a perspective view of one embodiment of a CT system detector array.

As shown in FIG. 3, detector assembly 18 includes rails 17 having collimating blades or plates 19 placed therebetween. Plates 19 are positioned to collimate x-rays 16 before such beams impinge upon, for instance, detector 20 of FIG. 4 positioned on detector assembly 18. In one embodiment, detector assembly 18 includes 57 detectors 20, each detector 20 having an array size of 64×16 of scintillator or pixel elements 50. As a result, detector assembly 18 has 64 rows and 912 columns (16×57 detectors) which allows 64 simultaneous slices of data to be collected with each rotation of gantry 12.

Figure 4:
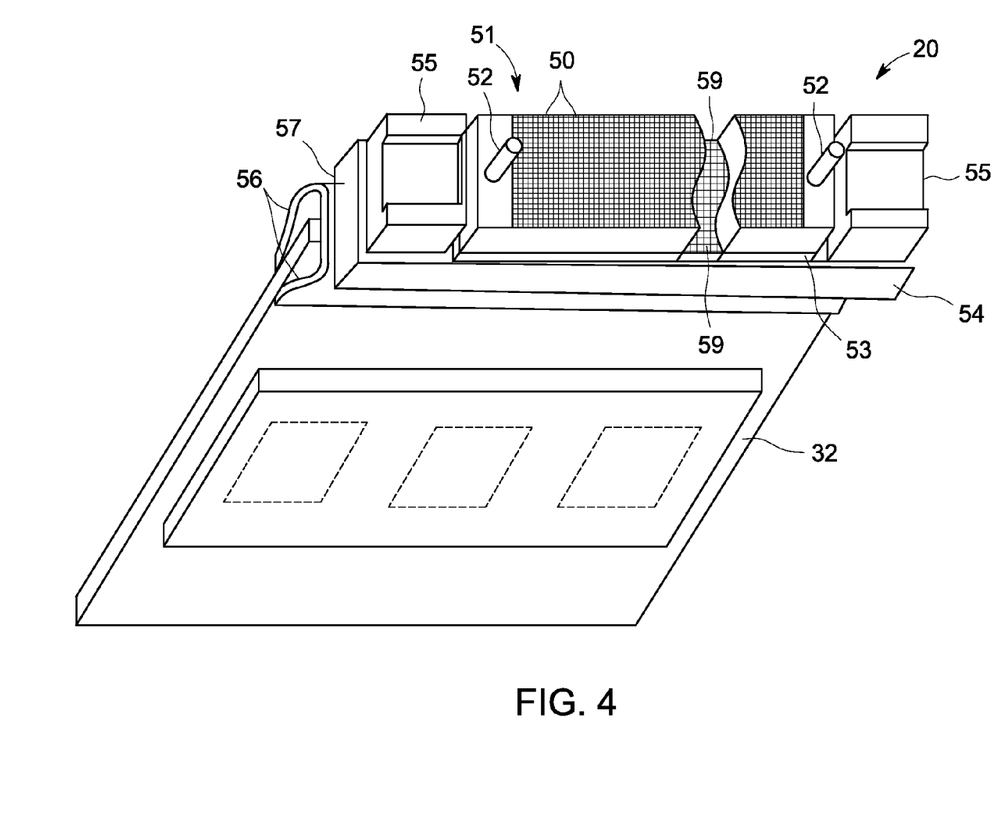
FIG. 4 is a perspective view of one embodiment of a detector.

Referring to FIG. 4, detector 20 includes DAS 32, with each detector 20 including a number of scintillator elements 50 arranged in pack 51. Detectors 20 include pins 52 positioned within pack 51 relative to scintillator elements 50. Pack 51 is positioned on a backlit diode array 53 having a plurality of diodes 59. Backlit diode array 53 is in turn positioned on multi-layer substrate 54. Spacers 55 are positioned on multi-layer substrate 54. Scintillator elements 50 are optically coupled to backlit diode array 53, and backlit diode array 53 is in turn electrically coupled to multi-layer substrate 54. Flex circuits 56 are attached to face 57 of multi-layer substrate 54 and to DAS 32. Detectors 20 are positioned within detector assembly 18 by use of pins 52.

In the operation of one embodiment, x-rays impinging within scintillator elements 50 generate photons which traverse pack 51, thereby generating an analog signal which is detected on a diode within backlit diode array 53. The analog signal generated is carried through multi-layer substrate 54, through flex circuits 56, to DAS 32 wherein the analog signal is converted to a digital signal.

According to embodiments of the present invention, scintillator elements 50 comprise a scintillator composition having a garnet structure activated with a rare earth metal ion. The scintillator composition is efficiently excitable by x-radiation and efficiently emits light for detection by the photodiodes 59 of diode array 53. In one aspect of the present invention, the scintillators are responsive to x-ray excitation and have high light output, reduced afterglow, enhanced stability under radiation, and high x-ray stopping power, as described in detail below. All metals disclosed herein are present in the scintillator compositions in combined form, usually as the oxide, rather than in elemental form. As used herein the term "scintillator" is used to mean a solid-state luminescent material that emits visible light in response to stimulation by high-energy radiation such as X, β, or γ radiation. In one embodiment of the invention the composition of the scintillating material is a single crystal. In another embodiment of the invention the composition of the scintillating material is a polycrystal.

The scintillator composition of embodiments of the present invention is a rare earth-activated garnet containing gadolinium and yttrium, and has a general formula:

$$(Gd_{1-x-y-z}Y_xA_yCe_z)_{3+u}(Ga_{1-m-n}Al_mD_n)_{5-u}O_{12}:wFO,$$

wherein A is at least one member selected from the group consisting of lutetium, lanthanum, terbium, and dysprosium; D is at least one member selected from the group consisting of indium and scandium; F is at least one member selected from the group consisting a divalent ion other than magnesium, such as of calcium, strontium, barium, zinc, and/or nickel; z is in the range from about 0.001 to and including 0.05; x is in the range from and including zero to 0.2; y is in the range from zero to 0.5; u is in the range from zero to 0.1; n is in the range from and including zero to 0.2; m is in the range from about 0.3 to 0.6; and w is in the range from and including about 10 ppm (mass) to and including 300 ppm (mass). The ratio of y to x is greater than 1. In one embodiment, x is preferably in the range from 0.05 to 0.2, and y is preferably in the range from 0.05 to 0.5.

In one embodiment of the invention, the scintillator is activated with cerium and has an emission band that is centered around approximately 560 nm. Due to the fast transition of cerium, the decay speed of this scintillator is very fast with a primary decay time less than 200 ns. One skilled in the art will recognize that, while embodiments of the invention are described herein using cerium as the activator, alternate rare earth metals such as, for example, praseodymium or neodymium, may be used.

The inclusion of yttrium, lutetium, dysprosium, and/or terbium in the scintillator composition yields improved stability of the cubic garnet structure over a gadolinium scintillator. Gadolinium has a larger ionic radius than yttrium, lutetium, dysprosium, or terbium and tends to promote a perovskite structure (GdAlO$_3$). Too much perovskite phase in the scintillator composition leads to undesirable scintillator properties including lower transparency, lower light output due to light scatter, and less uniform material. The addition of one or more elements having a smaller ionic radius, such as yttrium, lutetium, terbium, or dysprosium, helps retain and stabilize the garnet structure.

Embodiments of the scintillator composition of the present invention introduce yttrium, which is a relatively light rare earth element, simultaneously with one or more relatively heavy rare earth elements such as lutetium, dysprosium, and terbium. The mixture of relatively light and relatively heavy rare earth elements leverages the benefits of yttrium, which decreases the amount of perovskite phase material in the scintillator composition, with the benefits of heavier rare earth elements, which increase the density of the scintillator material and help retain high radiation stopping power. As stated above, the ratio of relatively heavy rare earth elements, y, to relatively light rare earth elements, x, in the scintillator composition is greater than 1.

In one preferred embodiment, the scintillator is a lutetium gadolinium aluminum gallium garnet activated with cerium doped with calcium oxide having the formula $Gd_{2.849}Lu_{0.15}Ce_{0.005}Ga_{1.998}Al_{2.998}O_{12}$:(25-100 ppm)CaO.

Configurations of scintillator composition of embodiments of the present invention have reduced damage upon exposure to high-energy radiation relative to known scintillator compositions. Also, such scintillator compositions have an advantage of enabling a scintillator to be deposited on a detector array to be thinner, while still stopping (and hence, protecting the detector array from) x-rays that would otherwise be passed by known scintillator compositions. In addition, the thinner scintillator composition allows optical transmission of scintillations to be more efficient because there is less material to transverse. Also, less light bounces of edges of the scintillator as the light travels toward a detector diode. Also, thinner scintillator coatings are easier to manufacture, because less material has to be cut to make detector modules, and it is easier to properly align the modules.

Additionally, the use of divalent ions other than magnesium, such as, for example, calcium, strontium, barium, and zinc, as a dopant results in a scintillator composition with significantly improved afterglow as compared with undoped samples due to charge compensation effects. The defects caused by the divalent ions can help to detrap or remove some defects that are near the edge of the host conduction band, thereby reducing the time at which electrons are held and speeding up the transition. Divalent ions such as calcium, strontium, barium, and zinc do not decrease light output as much as magnesium when used as a dopant, thereby improving signal-to-noise ratio (SNR) and image quality.

In one preferred embodiment, the scintillator composition has the formula $(Gd_{1-x-y-z}Y_xA_yCe_z)_{3+u}(Ga_{1-m-n}Al_mD_n)_{5-u}O_{12}$:wSrO where x, y, z, u, m, and n take the values as defined above and w is in the range from 10 ppm to 300 ppm.

Figure 5:
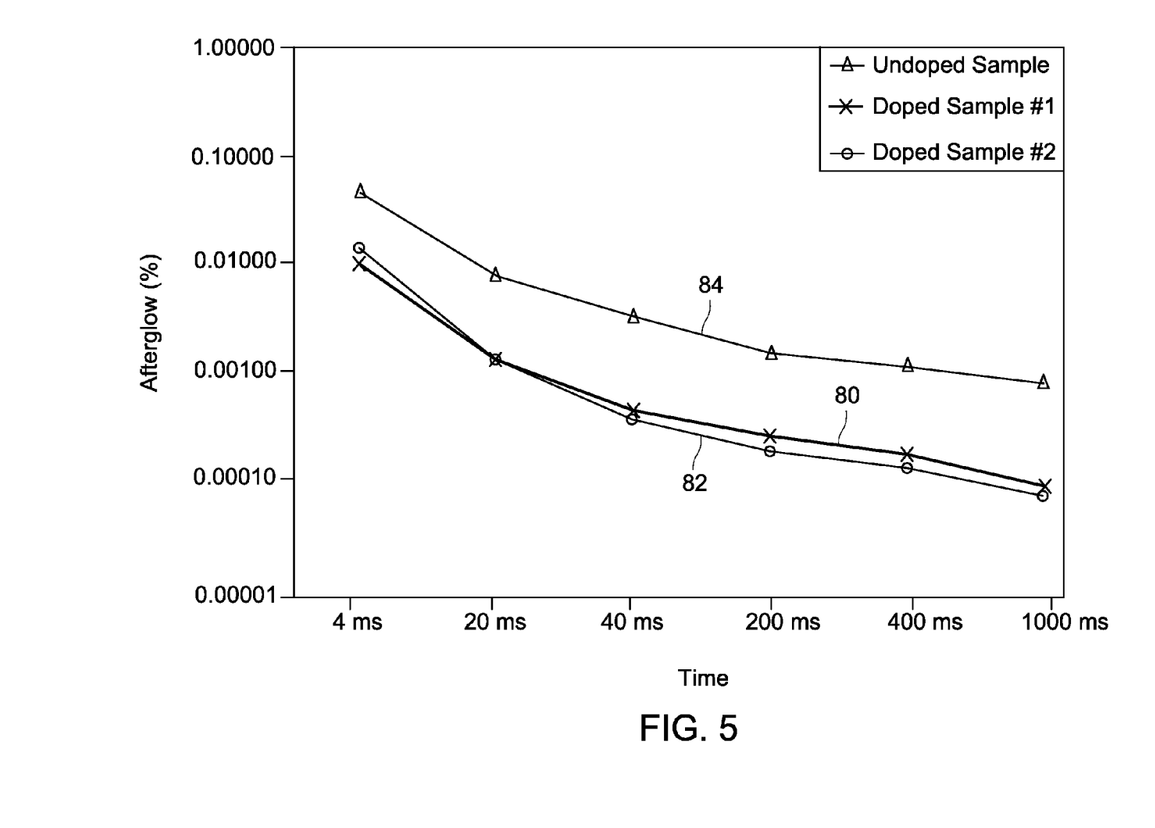
FIG. 5 is a graph of the percent afterglow over time of a rare earth based garnet scintillator material of the present invention under x-ray excitation.

Referring to FIG. 5, the percent afterglow over time is illustrated for two samples 80, 82 of scintillator compositions of embodiments of the present invention after being excited with x-rays. Samples 80, 82 were doped with 50 ppm calcium. For comparative purposes, the afterglow of an undoped sample 84 excited in a similar manner as samples 80, 82 is also provided. As shown, the percent afterglow of samples 80, 82 is significantly less over time than that of undoped sample 84.

Figure 6:
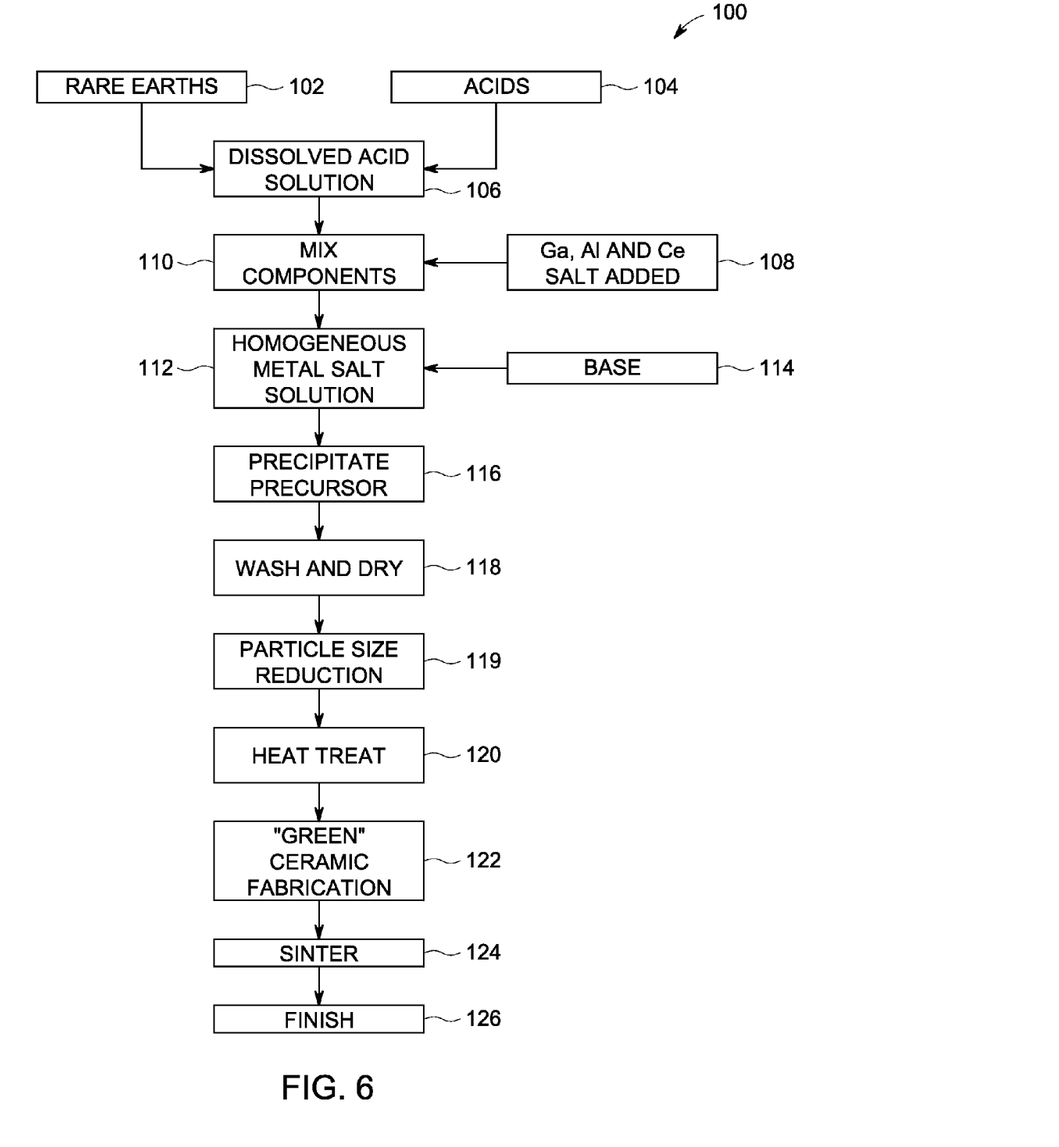
FIG. 6 is a technique for fabricating a rare earth based garnet ceramic scintillator material.

Referring now to FIG. 6, a technique 100 for fabricating a rare earth based garnet ceramic scintillator having the general formula $(Gd_{1-x-y-z}Y_xA_yCe_z)_{3+u}(Ga_{1-m-n}Al_mD_n)_{5-u}O_{12}$:wFO is disclosed at step 102, the rare earth elements are selected. One or more acids, such as nitric acid, hydrochloric acid, and sulfuric acid, as examples, selected at step 104. The rare earth elements and acid are combined to form a dissolved acid solution at step 106 having the one or more rare earths dissolved therein. A divalent ion other than magnesium may also be added at step 106. In one embodiment, the divalent ion is added in the form of an oxide.

At step 108, sources of gallium, aluminum, and cerium are selected and mixed with the dissolved acid solution at step 110. According to embodiments of the invention, gallium is added in the form of any number of compounds including, but not limited to, $Ga_2O_3$, $NH_4Ga(SO_4)_2 \cdot 12H_2O$, $GaCl_3 \cdot xH_2O$, $Ga(NO_3) \cdot xH_2O$, and $Ga_2(SO_4)_3 \cdot xH_2O$. According to embodiments of the invention, aluminum is added in the form of any number of compounds including, but not limited to, $NH_4Al(SO_4)_2 \cdot 12H_2O$, $AlCl_3 \cdot xH_2O$, $Al(NO_3)_3 \cdot xH_2O$, $Al_2(SO_4)_3 \cdot xH_2O$, and $(NH_4Al(OH)_2CO_3)$. According to embodiments of the invention, cerium is added in the form of any number of compounds including, but not limited to, cerium carbonate, cerium sulfate, cerium nitrate, and cerium chloride.

After the mixing of components at step 110, a homogeneous metal salt solution is formed at step 112. A base is added to the homogeneous metal salt solution and reacted therewith, the base selected at step 114. According to embodiments of the invention, the base includes, but is not limited to, ammonium hydroxide, ammonium bicarbonate, ammonium carbonate, or combinations thereof, thus forming a precipitate precursor at step 116. At step 118, the precipitate precursor is washed and dried, and particle size is reduced via a non-mechanical method such as freeze-drying at step 119. When freeze-drying, a wet cake of precipitate is frozen under vacuum, as understood in the art. At step 120, the freeze-dried product is heat treated to form a uniform oxide. In one embodiment of the invention, particle size is reduced via an air milling or jet milling process. Air milling (or jet milling) can be done either prior to heat treating of step 120, or afterward.

Thus, by reducing particle size by either freeze-drying or air milling, a final fluffy powder having little agglomeration may be realized having a good sinterability, while having little or no contamination introduced therein as compared with conventional milling processes that use, for instance, alumina or other milling media. After heat treating at step 120, a "green" ceramic wafer is fabricated at step 122. As understood in the art, a green ceramic wafer is a ceramic in its unfired state. The green ceramic wafer is sintered at step 124, as understood in the art, and the process ends at step 126.

Figure 7:
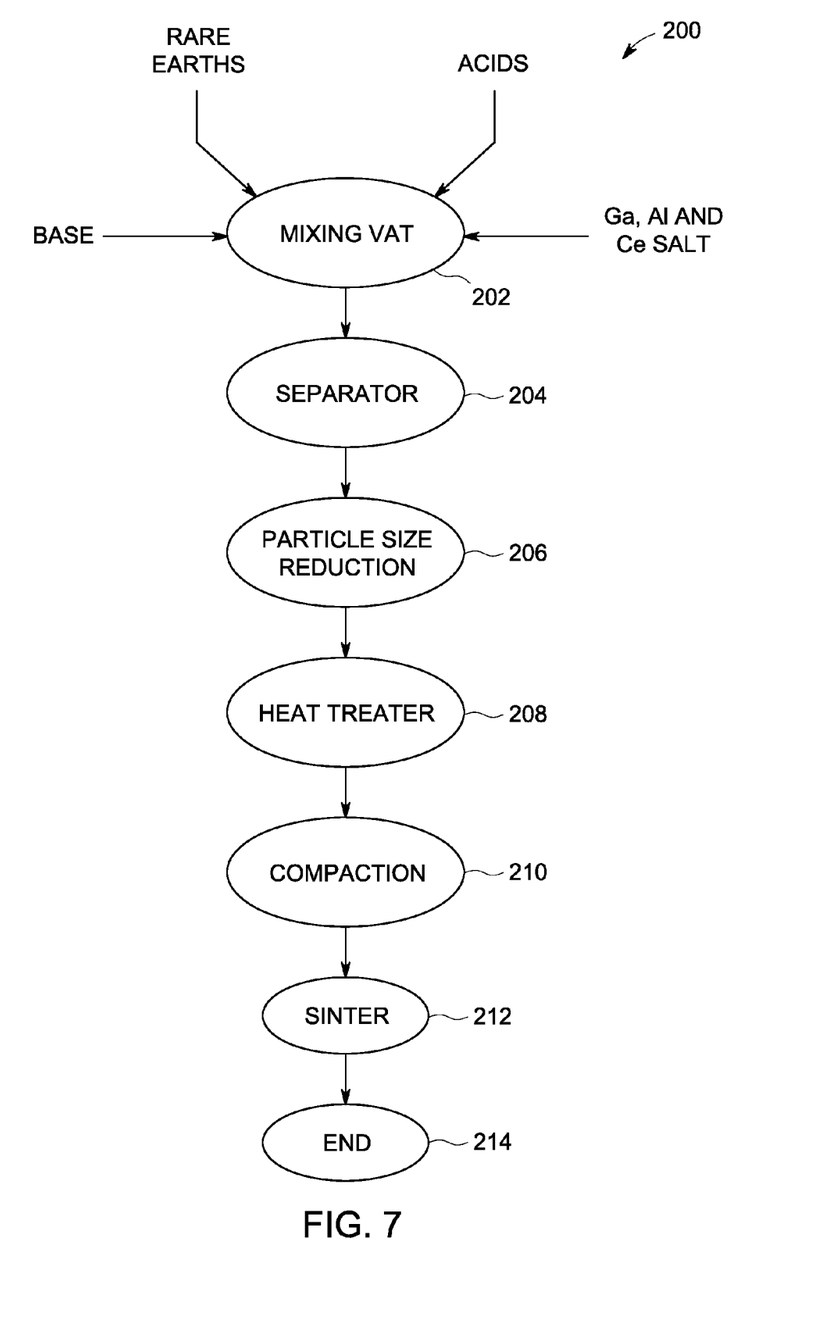
FIG. 7 is a manufacturing line for fabricating a rare earth based garnet ceramic scintillator material.

Technique 100 may be implemented in a manufacturing line 200 as illustrated in FIG. 7. FIG. 7 illustrates a number of devices that may be used in a manufacturing process to implement technique 100. However, it is to be understood that the invention is not limited to the devices illustrated in FIG. 7, but that technique 100 may be implemented by using more or less than the devices illustrated or by using equivalent devices. For instance, manufacturing line 200 illustrates a mixing vat 202 into which a base, rare earths, acids, and Ga/Al/Ce source materials are mixed. However, it is to be understood that mixing vat 202 may include multiple sub-stages and that mixing vat 202 is simply illustrative of what may be one or more devices.

Thus, according to embodiments of the invention, mixing vat 202 may include a single vat into which all components are added and mixed, or mixing vat 202 may be divided into sub-stages where, for instance, rare earths and acids are mixed (corresponding to steps 102 and 104 of technique 100) to form a dissolved acid solution as in step 106 of technique 100. After mixing the rare earth elements and acids, the resulting dissolved acid solution may be conveyed to another substage where components may be mixed, corresponding to step 108, and Ga, Al, and Ce source materials may be added thereto. In fact, one skilled in the art will recognize that all such steps may be performed in multiple devices and that the devices illustrated in manufacturing line 200 are simply illustrative of devices which correspond to the steps described in technique 100.

Manufacturing line 200 includes a separator 204, which may remove or filter precipitate that results from the homogeneous metal salt solution formed at step 112 and after base materials are added at step 114. Thus, a powder is separated from liquid, washed and dried in separator 204. Particle size is reduced in a particle size reducing device 206, which, as described above, may be a freeze-dryer or an air mill. The dried powder is heat treated in a heat treater 208.

Powder that has been reduced in size is compacted in compaction device 210 to form a green ceramic wafer as understood in the art. The green ceramic wafer is sintered in device 212, and the process ends 214 where a finished ceramic is ready for final processing into a detector as understood in the art.

Figure 8:
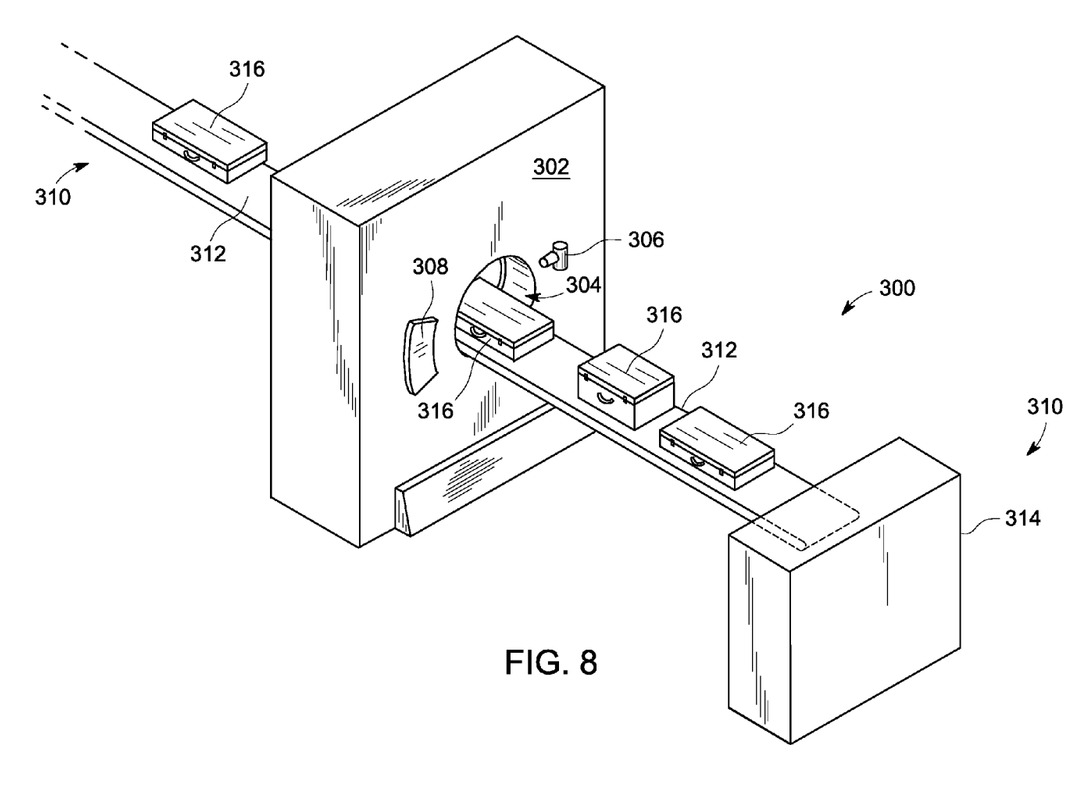
FIG. 8 is a pictorial view of a CT system for use with a non-invasive package inspection system.

Referring now to FIG. 8, package/baggage inspection system 300 includes a rotatable gantry 302 having an opening 304 therein through which packages or pieces of baggage may pass. The rotatable gantry 302 houses a high frequency electromagnetic energy source 306 as well as a detector assembly 308 having scintillator arrays comprised of scintillator cells similar to that shown in FIGS. 3 and 4. A conveyor system 310 is also provided and includes a conveyor belt 312 supported by structure 314 to automatically and continuously pass packages or baggage pieces 316 through opening 304 to be scanned. Objects 316 are fed through opening 304 by conveyor belt 312, imaging data is then acquired, and the conveyor belt 312 removes the packages 316 from opening 304 in a controlled and continuous manner. As a result, postal inspectors, baggage handlers, and other security personnel may non-invasively inspect the contents of packages 316 for explosives, knives, guns, contraband, etc.

According to one embodiment of the invention, a scintillating material with a garnet structure includes gadolinium, yttrium, cerium, gallium, and aluminum. The scintillating material is expressed as $(Gd_{1-x-y-z}Y_xA_yCe_z)_{3+u}(Ga_{1-m-n}Al_mD_n)_{5-u}O_{12}$:wFO, wherein A is lutetium, lanthanum, terbium, dysprosium, or a combination thereof; D is indium, scandium, or a combination thereof; F is a divalent ion; $0 \le x < 0.2$, $0 < y < 0.5$, $0.001 < z < 0.05$, $0 < u < 0.1$, $0 \le n < 0.2$, $0.3 < m < 0.6$, and 10 ppm$\le$w$\le$300 ppm; and y/x>1.

According to another embodiment of the invention, a method of manufacturing a rare earth garnet scintillator composition is set forth. The method includes the step of preparing a first solution comprising amounts of yttrium, at least one of lutetium, lanthanum, terbium, and dysprosium, and a divalent ion other than magnesium. The method also includes the steps of dissolving the first solution in an acid to form a second solution and preparing a third solution by mixing the second solution with amounts of gallium, aluminum, and cerium. The method further includes the step of firing the third solution for a time sufficient to convert the third solution to a rare earth-activated garnet scintillator composition. The components in the first and third solutions are selected to obtain a scintillator composition having a formula of $(Gd_{1-x-y-z}Y_xA_yCe_z)_{3+u}(Ga_{1-m-n}Al_mD_n)_{5-u}O_{12}$:wFO, wherein A is at least one member selected from the group consisting of lutetium, lanthanum, terbium, and dysprosium, D is at least one member selected from the group consisting of indium and scandium, F is a divalent ion, and x is in a range from and including 0 to 0.2, y is in a range from about 0 to 0.5, the ratio of y to x is greater than 1, z is in a range from about 0.001 to 0.05, u is in a range from about 0 to 0.1, n is in a range from about 0 to and including 0.2, m is in a range from about 0.3 to 0.6, and w is in a range from and including 10 ppm to and including 300 ppm.

According to yet another embodiment of the invention, a detector element capable of detecting high-energy radiation includes a cerium-activated gadolinium aluminum gallium garnet scintillator composition having a formula of $(Gd_{1-x-y-z}Y_xA_yCe_z)_{3+u}(Ga_{1-m-n}Al_mD_n)_{5-u}O_{12}$:wFO. A is at least one rare earth metal selected from the group consisting of Lu, La, Tb, Dy or any combination thereof, D is selected from the group consisting of In and Sc, F comprises a divalent ion other than magnesium, and x is in a range from and including 0 to 0.2, y is in a range from about 0 to 0.5, the ratio of y to x is greater than 1, z is in a range from about 0.001 to 0.05, u is in a range from about 0 to 0.1, n is in a range from about 0 to and including 0.2, m is in a range from about 0.3 to 0.6, and w is in a range from and including 10 ppm to and including 300 ppm.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A scintillating material with a garnet structure comprising:
    gadolinium, yttrium, cerium, gallium, and aluminum;
    wherein the scintillating material is expressed as $(Gd_{1-x-y-z}Y_xA_yCe_z)_{3+u}(Ga_{1-m-n}Al_mD_n)_{5-u}O_{12}$:wFO, wherein A is lutetium, lanthanum, terbium, dysprosium, or a combination thereof;
    wherein D is indium, scandium, or a combination thereof;
    wherein F is a divalent ion selected from the group comprising calcium, strontium, barium, and zinc;
    wherein $0 \le x < 0.2$, $0 < y < 0.5$, $0.001 < z < 0.05$, $0 < u < 0.1$, $0 \le n < 0.2$, $0.3 < m < 0.6$, and 10 ppm (mass)$\le$w$\le$300 ppm (mass); and
    wherein y/x>1 when x>0.

2. The scintillating material of claim 1 wherein the scintillating material comprises a single crystal.

3. The scintillating material of claim 1 wherein the scintillating material comprises a polycrystal.

4. The scintillating material of claim 1 wherein F comprises calcium.

5. The scintillating material of claim 1 wherein $0.05 < y < 0.5$.

6. The scintillating material of claim 1 wherein $0.05 < x < 0.2$.

7. A method of manufacturing a rare earth garnet scintillator composition, the method comprising the steps of:
    preparing a first solution comprising amounts of:
       at least one of lutetium, lanthanum, terbium, and dysprosium; and
       a divalent ion other than magnesium;

dissolving the first solution in an acid to form a second solution;

preparing a third solution by mixing the second solution with amounts of:
  gallium;
  aluminum; and
  cerium;

forming a precipitate precursor from the third solution by adding a base to the third solution;

firing the precipitate precursor for a time sufficient to convert the precipitate precursor to a rare earth-activated garnet scintillator composition;

wherein components in the first and third solutions are selected to obtain a scintillator composition having a formula of $(Gd_{1-x-y-z}Y_xA_yCe_z)_{3+u}(Ga_{1-m-n}Al_mD_n)_{5-u}O_{12}$:wFO, wherein A is at least one member selected from the group consisting of lutetium, lanthanum, terbium, and dysprosium, D is at least one member selected from the group consisting of indium and scandium, F is a divalent ion;

wherein x is in a range from and including 0 to 0.2, y is in a range from about 0 to 0.5, the ratio of y to x is greater than 1 when x is greater than 0, z is in a range from about 0.001 to 0.05, u is in a range from about 0 to 0.1, n is in a range from about 0 to and including 0.2, m is in a range from about 0.3 to 0.6, and w is in a range from and including 10 ppm (mass) to and including 300 ppm (mass); and wherein the first solution further comprises yttrium when x is greater than 0.

8. The method of claim 7 wherein components in the first and third solutions are selected to obtain a scintillator composition comprising $Gd_{2.849}Lu_{0.15}Ce_{0.005}Ga_{1.998}Al_{2.998}O_{12}$:wCaO;
  wherein 25 ppm (mass)≤w≤100 ppm (mass).

9. A detector element capable of detecting high-energy radiation comprising:
  a cerium-activated gadolinium aluminum gallium garnet scintillator composition having a formula of $(Gd_{1-x-y-z}Y_xA_yCe_z)_{3+u}(Ga_{1-m-n}Al_mD_n)_{5-u}O_{12}$:wFO;
  wherein A is at least one rare earth metal selected from the group consisting of Lu, La, Tb, Dy or any combination thereof;
  wherein D is selected from the group consisting of In and Sc;
  wherein F comprises a divalent ion other than magnesium and comprises one or more elements selected from the group comprising Ca, Sr, Ba, and Zn; and
  wherein x is in a range from and including 0 to 0.2, y is in a range from about 0 to 0.5, the ratio of y to x is greater than 1 when x is greater than 0, z is in a range from about 0.001 to 0.05, u is in a range from about 0 to 0.1, n is in a range from about 0 to and including 0.2, m is in a range from about 0.3 to 0.6, and w is in a range from and including 10 ppm (mass) to and including 300 ppm (mass).

10. The detector element of claim 9 wherein F is Sr.

11. The detector element of claim 9 wherein the garnet scintillator composition is capable of emitting visible light in response to high-energy radiation selected form the group consisting of X, β, and γ radiation.

12. The detector element of claim 9 wherein the garnet scintillator composition comprises $Gd_{2.849}Lu_{0.15}Ce_{0.005}Ga_{1.998}Al_{2.998}O_{12}$:wCaO; and
  wherein 25 ppm (mass)≤w≤100 ppm (mass).

13. The detector element of claim 9 wherein 0.05<y<0.5.

14. The detector element of claim 9 wherein 0.05<x<0.2.

15. The detector element of claim 9 wherein the garnet scintillator composition comprises a single crystal.

16. The detector element of claim 9 wherein the garnet scintillator composition comprises a polycrystal.

17. A scintillating material comprising:
  $Gd_{2.849}Lu_{0.15}Ce_{0.005}Ga_{1.998}Al_{2.998}O_{12}$:wCaO;
  wherein 25 ppm (mass)≤w≤100 ppm (mass).

* * * * *